Figure 1:
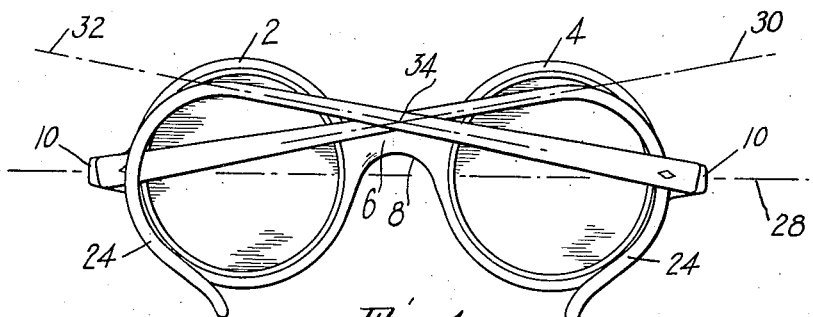

March 16, 1926.  
A. A. JEANERET  
OPHTHALMIC MOUNTING  
Filed Feb. 25, 1924

1,576,872

Inventor:-
Albert A Jeaneret
by David Rines
Attorney:-

Patented Mar. 16, 1926.

1,576,872

UNITED STATES PATENT OFFICE.

ALBERT A. JEANERET, OF WATERTOWN, MASSACHUSETTS, ASSIGNOR TO BAUSCH & LOMB OPTICAL COMPANY, OF ROCHESTER, NEW YORK, A CORPORATION OF NEW YORK.

OPHTHALMIC MOUNTING.

Application filed February 25, 1924. Serial No. 694,984.

*To all whom it may concern:*

Be it known that I, ALBERT A. JEANERET, a citizen of the United States, and a resident of Watertown, in the county of Middlesex and State of Massachusetts, have invented a new and useful Improvement in Ophthalmic Mountings, of which the following is a specification.

The present invention relates to ophthalmic mountings, and more particularly to spectacles of the "all-shell" type.

Spectacles of the above-described character comprise lens-holding rims, a bridge and temple end pieces, all integrally connected together and constituted of some non-metallic material, such as zylonite, horn, tortoise shell and the like. The spectacles are provided with temples constituted of like material that are hinged to the end pieces. The temples are provided with ear-engaging or skull-engaging hooks. When the temples are folded, these hooks project to one side of the rims. A folded pair of spectacles of the "all-shell" type is therefore bulky, and requires a large spectacle case. As the non-metallic material is not easily flexible, any attempt to force the hooks to overlie the rims will result in weakening the hinge connection between the temples and the end pieces; so that the bulky cases have been conceded to be a necessary evil.

An object of the present invention is to provide an ophthalmic mounting of the above-described character that shall be foldable into more compact shape, making it possible to use a smaller spectacle case; and with this and other objects in view, the nature of which will appear from the following description, taken in connection with the accompanying drawings, the invention consists of the improved opthalmic mounting hereinafter described, illustrated in the drawings, and defined in the appended claims.

Figure 2:
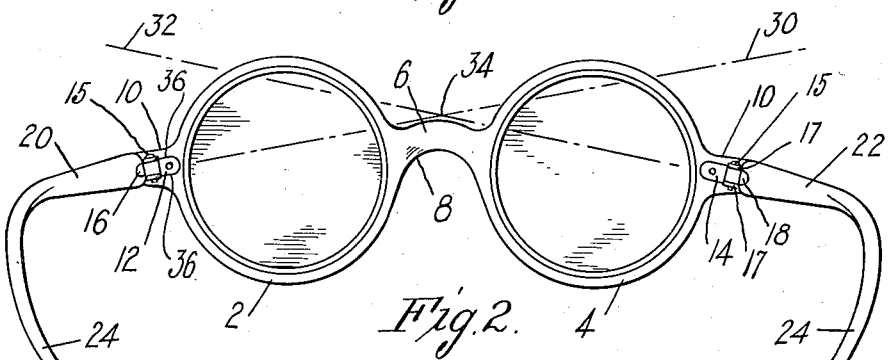
Figure 3:
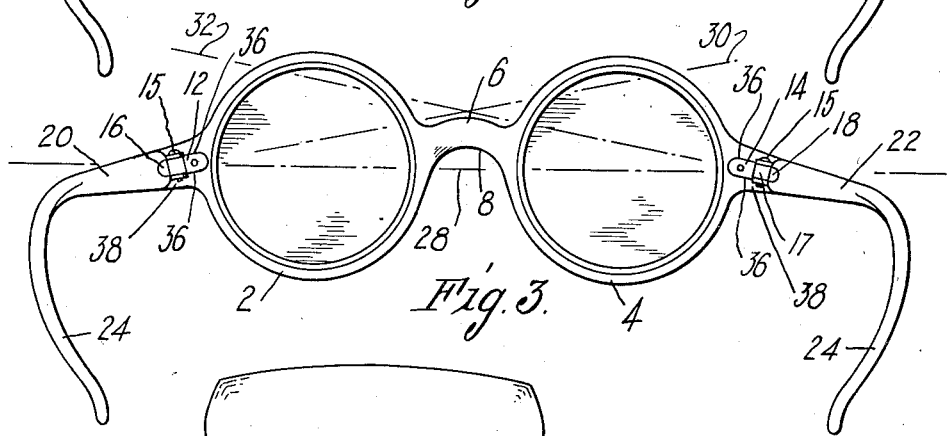
Figure 4:
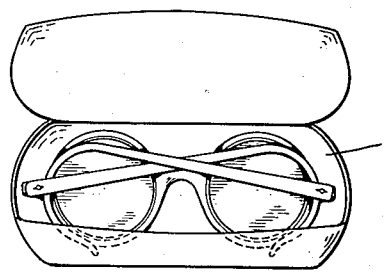

In the drawings, Fig. 1 is a rear elevation of a pair of spectacles constructed according to a preferred embodiment of the present invention, the temples being shown folded; Fig. 2 is a similar view with the temples unfolded, or open; Fig. 3 is a view similar to Fig. 2 of a modification; and Fig. 4 is a view upon a reduced scale, showing the temples in position in a spectacle case.

The illustrated ophthalmic mounting comprises two lens-holding rims 2 and 4 integrally connected together by a bridge 6, and all constituted of non-metallic material. The surface 8 of the bridge is adapted to seat upon a wearer's nose. The rims are each provided with an integral end piece 10 at a point approximately diametrically opposite to the bridge 6. One of the hinge plates 12 of a two-plate hinge is secured to one of the end pieces 10, and one of the hinge plates 14 of another two-plate hinge is secured to the other end piece 10. The two plates 12 and 16, and 14 and 18, respectively, of each hinge are pivoted together about a pivot pin 15 extending through ears 17 of the hinge plates. The other hinge plates 16 and 18 of the hinges are respectively secured to the forward ends of temples 20 and 22, that therefore pivot about the pivot pins.

Ophthalmic mountings as thus far described are old and well known, but the temples of the old mountings are adapted to pivot about their hinges substantially in a plane passing through the end pieces 10 and perpendicular to the plane of the rims 2 and 4. The rearwardly disposed, curved ear hooks 24 of the temples, when folded, therefore project down below the rims 2 and 4. It is impossible to place folded spectacles of this character into a spectacle case 26 unless the case is made wide enough to include not only the rims and the bridge, but the projecting temples, as well. A case of such large size is very inconvenient to carry around, with the result that the spectacles are placed directly in the pocket, without a case, and this causes large breakage.

According to the specific embodiment of the present invention that is herein illustrated and described, the hinge plate 12 is secured to its end piece 10 in such fashion that its pivot ears 17 are obliquely disposed to the line 28 joining the end pieces 10 and passing substantially through the centers of the rims. The other hinge plate 16 of the hinge pivots about its pivot pin 15 in a plane disposed obliquely, or to one side of, the line joining the two end pieces 10. This will be understood from Fig. 1, in which the hinge plate 16, and the temple 20 to which it is secured, swings in the plane perpendicular to the paper and passing through the dotted line 30. The hinge plate 14 is similarly secured to the other hinge plate 10 in such fashion that the hinge plate 18, and the temple 22 to which it is secured, pivot in a plane at right angles to the paper and passing through the dotted line 32. The intersecting line of the oblique planes passing through the lines 30 and 32 is indicated by the point 34, which is situated farther from the nose-seating portion 8 of the bridge 6 than other portions of the bridge, and the pivot pins 15 converge toward a point on the other side of the nose-bearing portion 8. The ear hooks of the temples will therefore overlie the rims when the temples are folded, as is illustrated in Fig. 1. A folded pair of spectacles of this constructon will therefore readily be received in a spectacle case 26 of moderate dimensions, as is illustrated in Fig. 4.

As the hinge plates are elongated, being provided with substantially parallel walls 36, substantially parallel to the pivot ears, and substantially parallel, respectively, to the lines 30 and 32, the walls are necessarily disposed at an angle to the end pieces 10 shown in Figs. 1 and 2. According to the modifications shown in Fig. 3, however, the end pieces 10 project from the rims in directions substantially parallel to the lines 30 and 32, respectively. This gives a more finished appearance to the spectacles when the temples are unfolded or open, as is illustrated in Fig. 3.

It will, of course, be understood that the invention is not restricted to the exact embodiments thereof that are illustrated and described herein, as changes may be readily made by persons skilled in the art without in the least departing from the spirit and scope of the invention, as defined in the appended claims.

What is claimed is:

1. An ophthalmic mounting comprising a lens-holding rim constituted of non-metallic material having an integral end piece, a hinge plate secured to the end piece having a pivot ear that is obliquely disposed to the line joining the ear and the center of the rim, a pivot pin in the ear, and a temple pivoted about the pivot pin, whereby the temple is adapted to pivot about the pivot pin in a plane positioned at one side of the center of the rim.

2. An ophthalmic mounting comprising two lens-holding rims and a bridge integrally connecting the lens-holding rims and all constituted of non-metallic material, the rims each having an integral end piece at a point opposite to the bridge, a hinge plate secured to each end piece having a pivot ear obliquely disposed to the line connecting the end pieces, a pivot pin in the ear of each hinge plate, and a temple pivoted about each pivot pin, whereby the temples are adapted to pivot about the pivot pins in planes obliquely disposed to the said line connecting the end pieces.

3. An ophthalmic mounting comprising two lens-holding rims and a bridge integrally connecting the lens-holding rims and all constituted of non-metallic material, the bridge having a portion adapted to seat upon the nose of a wearer and the rims each having an integral end piece at a point opposite to the bridge, a hinge plate secured to each end piece having a pivot ear obliquely disposed to the line connecting the end pieces, a pivot pin in the ear of each hinge plate, the pivot pins converging towards a point nearer to the nose-seating portion of the bridge than to other portions of the bridge, and two temples having each a forward portion and a rear curved portion, the forward portions being pivoted about the pivot pins, whereby the temples are adapted to pivot about the pivot pins in planes obliquely disposed to the said line connecting the end pieces, and the curved portions of the temples are adapted to overlie the rims when the temples are folded.

4. An ophthalmic mounting comprising two lens-holding rims and a bridge integrally connecting the lens-holding rims and all constituted of non-metallic material, the rims each having an integral end piece at a point opposite to the bridge, a hinge plate having substantially parallel walls and a pivot ear substantially parallel to the walls secured to each end piece with the walls disposed obliquely to the line connecting the end pieces, a pivot pin in the ear of each hinge plate, and a temple pivoted about each pivot pin, whereby the temples are adapted to pivot about the pivot pins in planes substantially parallel to the parallel walls.

5. An ophthalmic mounting comprising two lens-holding rims and a bridge integrally connecting the lens-holding rims and all constituted of non-metallic material, the bridge having a portion adapted to seat upon the nose of a wearer and the rims each having an integral end piece at a point opposite to the bridge, two hinges each comprising two hinge plates pivoted together, one of the hinge plates of each hinge being secured to each end piece in such fashion that the other hinge plate of each hinge shall pivot in a plane obliquely disposed to the line joining the end pieces, the intersecting line of the said oblique planes being farther from the nose-seating portion of the bridge than from other portions of the bridge, and two temples each having a forward portion and a rear curved portion, the other hinge plates of the hinges being respectively secured to the forward portions of the temples, whereby the temples are adapted to pivot in the said oblique planes, and the curved portions of the temples are adapted to overlie the rims when the temples are folded.

6. An ophthalmic mounting comprising two lens-holding rims and a bridge integrally connecting the lens-holding rims and all constituted of non-metallic material, the rims each having an integral end piece at a point opposite to the bridge and projecting from the said two points in directions oblique to the line joining the said two points, a hinge plate having substantially parallel walls and a pivot ear substantially parallel to the walls secured to each end piece with the walls disposed substantially parallel to the said oblique directions, respectively, a pivot pin in the ear of each hinge plate, and a temple pivoted about each pin, whereby the temples are adapted to pivot about the pivot pins in planes substantially parallel to the said oblique directions, respectively.

7. An ophthalmic mounting comprising a lens-holding rim constituted of non-metallic material having an end piece projecting integrally from the rim, a hinge plate secured to the end piece having a pivot ear that is obliquely arranged to the line joining the ear and the center of the rim, and a temple pivoted to the ear, whereby the temple is adapted to pivot about the ear in a plane positioned at one side of the center of the rim.

8. An ophthalmic mounting comprising two lens-holding rims and a bridge integrally connecting the lens-holding rims and all constituted of non-metallic material, the rims each having an integral end piece at a point opposite to the bridge, a hinge member secured to each end piece having substantially parallel walls and a pivot ear that is obliquely arranged to the line joining the centers of the rims, and a temple pivoted to each ear, whereby the temple is adapted to pivot about the corresponding ear in a plane oblique to the said line joining the centers of the rims.

In testimony whereof, I have hereunto subscribed my name this 23d day of January, 1924.

ALBERT A. JEANERET.